W. F. BOWERS.
CONCENTRATOR BELT.
No. 552,952.
Patented Jan. 14, 1896.
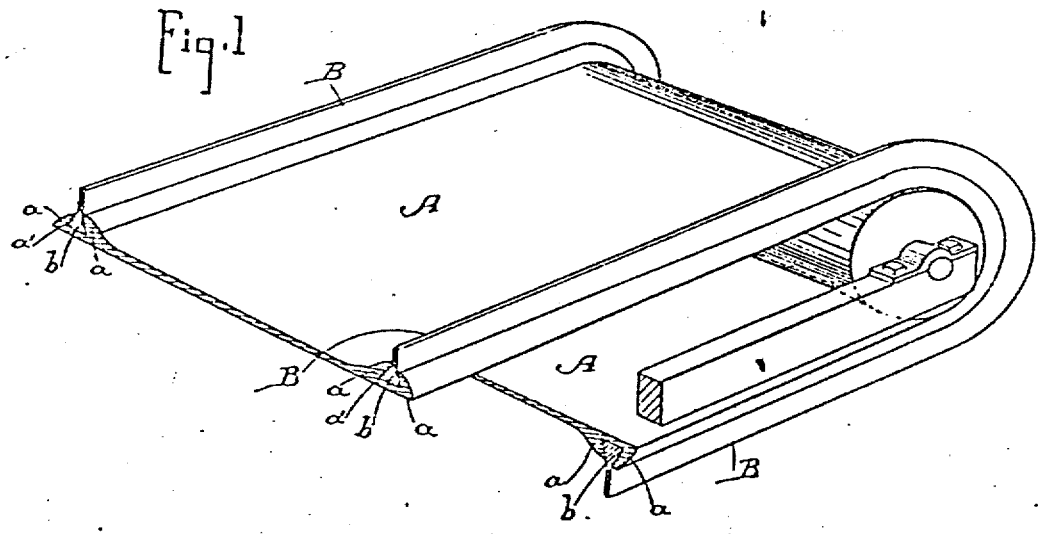
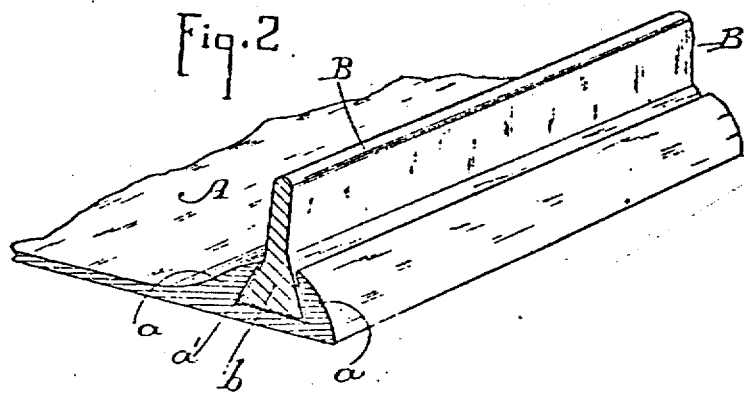

WILLIAM F. BOWERS, OF SAN FRANCISCO, CALIFORNIA.

CONCENTRATOR-BELT.

SPECIFICATION forming part of Letters Patent No. 552,952, dated January 14, 1896.

Application filed March 6, 1895. Serial No. 540,757. (No model.)

*To all whom it may concern:*

Be it known that I, WILLIAM F. BOWERS, a citizen of the United States, residing in the city and county of San Francisco, State of California, have invented an Improvement in Concentrator-Belts; and I hereby declare the following to be a full, clear, and exact description of the same.

My invention relates to the class of belts used in concentrating or vanning machines. These belts are made with a broad concentrating or working surface and with side flanges which keep the material on the belt.

The flanges of the belt are subject to more wear and tear and greater strains than other portions, and are liable to and generally do wear out and break or crack, or for other reasons become useless, sooner than the remainder of the belt. As these belts are made of rubber and are quite costly, it follows that great loss attends upon the necessity of discarding a belt simply because of its injured or worthless flange, while the working portion remains in good condition. This contingency has long been the subject of consideration and various efforts have been made to avoid the wearing out of or other injury to the flanges before the life of the belt is expended.

The direction in which some of these efforts have been made is in peculiar shapes and construction of the flanges, as by arranging them to fold inwardly upon the belt in passing around the drums, or arranging them to lie flat outwardly or making them somewhat extensible by corrugating or waving them, so that they will not unduly stretch; in providing temporary flanges for the belt by raising up the edge of the belt itself; in some cases by fixed underlying guides or rollers and in others by traveling bands. It has, however, been also suggested to make the flanges entirely independent of the belt, so that they may be removed therefrom when necessary and others substituted. It is in this latter direction that my invention lies and its object is to provide a simple and practicable connection between the flange and belt, whereby the former may be readily removed for the substitution of another flange.

My invention consists of the improved concentrator-belt which I shall hereinafter fully describe and claim.

Referring to the accompanying drawings for a more complete explanation of my invention, Figure 1 is a perspective view of my concentrator-belt. Fig. 2 is an enlarged detail of same.

A is a portion of an ordinary rubber belt for a concentrator. Its side flange B is made independently of the belt, and is formed with a flaring wedge-shaped base portion $b$.

On the sides of the belt are formed the lips $a$, which, as shown, form an undercut groove and are upwardly converging, both as to their inner and outer surfaces, and form between them a space $a'$, in which the base $b$ of the flange B fits.

The convergence of the lips $a$ of the belt and their flexibility or elasticity cause said lips, when the belt is passing around the terminal drums, to lie down toward each other, and thereby to firmly and perfectly clamp the base $b$ of the flange B. This clamping is sufficient to hold the flange in place under all circumstances without the use of cement or any other fastening. The connection is one which may be easily made and broken.

It will be seen that the outer surfaces of the clamping lips are curved or inclined, so that the clamping effect of said lips is insured, and a further advantage is obtained of avoiding an angle or corner in the channel of the belt for accumulations of sand.

It is a difficult matter to hold an independent flange to a belt, and it has been the custom heretofore to provide additional fastening for the flanges—as, for example, where independent rubber flanges are set into grooves in the belt edges cement must be used, for the reason that there was no clamping effect upon the base of the flange by reason of converging lips adapted to lie down upon said base, as in my case; and without the cement it would be impossible to hold such a flange in place as the belt passes around the end drums. Nor is it practicable to connect an independent flange with the edge of the belt by inserting said edge in a groove in the flange, because in these concentrating-machines the shaking motion imparted to the frame would, without fail, loosen any such connection.

Having thus described my invention, what I claim as new, and desire to secure by Letters Patent, is—

A concentrator belt having its sides formed with opposing separated upwardly converging lips, forming an undercut groove and an independent flange having a flaring wedge shaped base fitted in said groove between the opposing lips, the walls of each of said lips converging to present a thin edge at the upper end against the inclined walls of the wedge shaped base of the flange whereby said edges automatically fold down and clamp said base as the belt passes over the terminal drums.

In witness whereof I have hereunto set my hand.

WILLIAM F. BOWERS.

Witnesses:
S. H. NOURSE,
WM. F. BOOTH.